(12) United States Patent
McNabney et al.

(10) Patent No.: US 8,800,584 B2
(45) Date of Patent: Aug. 12, 2014

(54) AUTOMATIC BARREL PIG LAUNCHER

(71) Applicant: Array Holdings, Inc., Houston, TX (US)

(72) Inventors: Jason McNabney, Conroe, TX (US); Brandon Marbach, Humble, TX (US)

(73) Assignee: Array Holdings, Inc., Houston, TX (US)

( * ) Notice: Subject to any disclaimer, the term of this patent is extended or adjusted under 35 U.S.C. 154(b) by 0 days.

(21) Appl. No.: 13/648,827

(22) Filed: Oct. 10, 2012

(65) Prior Publication Data

US 2014/0069512 A1 Mar. 13, 2014

Related U.S. Application Data

(60) Provisional application No. 61/698,276, filed on Sep. 7, 2012.

(51) Int. Cl.
*F16L 55/46* (2006.01)
*B08B 9/055* (2006.01)

(52) U.S. Cl.
USPC .... 137/15.07; 137/244; 137/268; 15/104.062

(58) Field of Classification Search
USPC ................... 137/268, 15.07, 242, 244, 245.5; 251/315.01, 315.1, 315.16, 315.08; 15/104.062

See application file for complete search history.

(56) References Cited

U.S. PATENT DOCUMENTS

| | | | | | |
|---|---|---|---|---|---|
| 3,265,083 | A | * | 8/1966 | Sachnik | 137/268 |
| 3,283,354 | A | * | 11/1966 | Simmons | 15/104.062 |
| 3,983,594 | A | * | 10/1976 | Simonelli | 15/104.062 |
| 4,016,621 | A | * | 4/1977 | Slegers et al. | 15/104.062 |
| 4,111,229 | A | * | 9/1978 | Christian | 15/104.062 |
| 5,884,656 | A | * | 3/1999 | Smith | 137/268 |
| 6,079,074 | A | * | 6/2000 | Ellett | 15/104.062 |
| 6,189,555 | B1 | * | 2/2001 | Palmer | 137/268 |
| 6,409,843 | B1 | * | 6/2002 | Ellett | 134/8 |
| 6,475,294 | B2 | * | 11/2002 | McCanna et al. | 15/104.062 |
| 6,536,461 | B2 | * | 3/2003 | Decker et al. | 137/268 |
| 7,051,760 | B1 | * | 5/2006 | Beamer et al. | 137/244 |
| 2002/0170599 | A1 | * | 11/2002 | Disher et al. | 137/269 |

* cited by examiner

*Primary Examiner* — Kevin Lee (57) ABSTRACT

Disclosed herein is an automatic barrel pig launcher with an actuated ball valve and a rotating magazine that contains one or more pigs. The automatic barrel pig launcher comprises a plate bore, bottom plate bore, upper case bore, and throughbore of a ball that, when aligned, provide loading of the pig into the throughbore of the ball. The pig is launched by opening the ball valve. Also disclosed herein are systems and methods of use of the automatic barrel pig launcher.

20 Claims, 5 Drawing Sheets

AUTOMATIC BARREL PIG LAUNCHER

PRIORITY

This application claims priority to U.S. Provisional Application 61/698,276 filed on Sep. 7, 2012, the contents of which are specifically incorporated herein.

FIELD

The invention relates generally to pig launchers, related systems, and methods of use. In particular the invention relates to an automatic barrel pig launcher comprising a magazine with multiple barrels for holding pigs until such a time that the pig is to be launched.

BACKGROUND

In the petroleum industry, a pig refers to a device inserted into a pipeline to perform a task. Pigs are used to perform various actions upon a pipeline such as clean a pipeline, diagnose problems with the pipeline, or separate various fluids or substances in the pipeline. Frequent pigging cleans the line to allow a higher product flow rate. Pigging can be used when changing from one fluid in the pipeline to another. Using a pig for diagnostic purposes allows for detection of a problem before it is critical. Pigs may be made of various materials.

Typically, pigs are inserted into a pipeline and travel through the pipeline by fluid pressure to another location where the pig may be removed. In some circumstances, pigs are captive and are not removed from the pipeline. Pigs may or may not interrupt the flow of the fluid through the pipeline.

Pigs are typically inserted into the pipeline via a pig launcher. In one type of pig launcher, a pipe of larger diameter than the pipeline to be pigged is used and the launching pipe gradually decreases in diameter to that of the pipeline to be pigged. The pig is placed in the larger diameter pipe. A similar configuration of equipment may be used for pig receiving.

Automated pig launchers are used to provide a number of pigs to be launched separately at a later time. Automated pig launching has the advantage that it is not necessary for an operator to be present. In some automated pig launchers, multiple pigs may be present so that an operator does not need to be present to insert a new pig each time. The pigs may be stacked vertically or horizontally.

A pig launcher may utilize a ball valve. Ball valves are known in the art, and have traditionally been used as an effective mechanism for regulating fluid flow in various conduits. Typically, ball valves are employed to open or close to enable or block a flow of fluid in a variety of applications. Various structural arrangements have been achieved for interrupting fluid flow by twisting a handle of a ball valve, and resuming fluid flow by twisting the handle back again. Ball valves commonly include a body, an adapter, a rotatable ball disposed within the body and adapter, and a stem coupled to the ball. Typically, ball valves include a housing having an inlet port and an outlet port. A throughbore internally connects the inlet port to the outlet port. An inlet conduit and an outlet conduit may be connected to the inlet port and the outlet port respectively. A central chamber is positioned in the path of the throughbore. A ball with a throughbore is positioned within the central chamber. A ball valve is a quarter turn valve. The ball may be rotated by an external handle. When the handle is twisted to align the throughbore of the ball with the path of the throughbore connecting the inlet port and outlet port, the throughbore connecting the ports is uninterrupted and fluid may flow between the inlet and outlet ports. When the handle is twisted so that the throughbore of the ball lies perpendicular to the throughbore connecting the ports, fluid flow is interrupted.

A particular type of ball valve that may be used in certain higher pressure applications incorporates a trunnion ball which has additional mechanical anchoring of the ball at the top and bottom. One particular advantage of a ball valve incorporating a ball and trunnion mechanism is that when spaced in the same longitudinal axis, the trunnions can act to prevent drift upwards or downwards within the ball valve casing by providing a balancing mechanism.

In oil and gas development or operations, time is money. The longer it takes to perform a task the more money that is being spent. The art field is in need of an automatic pig launcher that provides efficiency, cost savings, and safety by not requiring an operator to be present to launch each pig and is easy to access.

An automatic pig launcher that is more ergonomic and requires less equipment to access the magazine will be beneficial. Not having to insert a new pig each time provides efficiency by not requiring operator time, especially when the pig launcher is present a long distance away or in a harsh environment; is safer for the operator as pressure can build up and/or the material in the pipeline may be hazardous; it is better for the environment because there is less release of material in the pipeline into the environment; and it is better for the pipeline as there is less chance for contamination of the line with outside substances.

SUMMARY

Particular embodiments of the invention concern a pig launcher comprising: a plurality of barrels having a proximal end and a distal end and capable of containing at least one pig, the barrels defining a barrel axis and defining a barrel diameter; a magazine plate having a distal side and a proximal side, the distal side in connection with the proximal end of the plurality of barrels, the barrels extending through the magazine plate to the proximal side of the magazine plate; a bottom plate having a proximal side and distal side, the distal side abutting the proximal side of the magazine plate comprising a plate bore having a diameter approximately equal to or greater than the barrel diameter; a ball valve case having an upper case bore in physical connection the plate bore, the ball valve case further possessing a ball with a throughbore, and a first pipe bore and a second pipe bore, the pipe bores defining a flow axis perpendicular to the barrel axis; and a trunnion connected to the ball and perpendicular to both the flow axis the barrel axis. In such embodiments the magazine plate may be capable of being moved such that the barrel axis is in alignment with the plate bore and the upper case bore; and the ball may be capable of being rotated such that the throughbore is in alignment with the barrel axis, the plate bore and the upper case bore such that a pig is capable of moving from the barrel into the throughbore. In such embodiments, it is contemplated that after a pig moves from the barrel into the throughbore, the rotation of the ball approximately 90 degrees results in the throughbore and the pig being aligned with the flow axis.

It is further contemplated that in some embodiments a ball valve may have an upper case bore less than or greater than 90 degrees from the flow axis, yet when the throughbore is aligned with the upper case bore, fluid flow through the flow axis would be prevented. In such embodiments, the rotation of the ball may be less than or greater than 90 degrees.

In further embodiments concerning the pig launcher, when the pig is aligned with the flow axis, the pig may be propelled out of a pipe bore and into a pipe from a pressure exerted by a fluid flowing along the flow axis.

In still further embodiments of the pig launcher, movement of the magazine plate can result in each barrel at a time being in alignment with the plate bore.

Regarding movement of the magazine plate, in some embodiments, the movement of the magazine plate is performed manually by a user. In other embodiments, the movement of the magazine plate to align a barrel with the plate bore is performed by a motor capable of actuating said movement. Likewise, in certain embodiments involving rotation of the ball, a trunnion exits the ball valve case and the ball valve is rotated by a motor applying rotational force to said trunnion. However, in other embodiments, the trunnion is rotated manually by a user. In certain embodiments, these movements may be synchronized.

In such embodiments, wherein synchronization occurs, the magazine first moves to bring a barrel with a pig in alignment with the plate bore and then the ball valve rotates such that the throughbore is in alignment with the barrel axis and the pig enters the throughbore, followed by the throughbore rotating about 90 degrees to place the pig in the flow axis. This action may be repeated again as needed. Still further, the synchronization may occur when a preconditioned event signals a motor to move the magazine plate and a motor rotate the ball valve. Such preconditioned events may include, but are not limited to: time, temperature change of a fluid flowing through the flow axis, pressure change of a fluid flowing through the flow axis, or a combination thereof.

In certain embodiments the pig moves from the barrel into the throughbore by force of gravity. Likewise, the pig may enter the throughbore from the barrel by pressure exerted distal to the pig. Such pressure may be pneumatic, hydraulic, mechanical and the like.

Regarding the magazine and barrels of the pig launcher, in certain embodiments the barrels are in a circular formation. However, in other embodiments, the barrels are in a linear formation.

Other embodiments of the invention pertain to a method of launching multiple pigs into a fluid transporting pipeline, the method comprising the following steps: 1) obtaining a ball valve with a ball having a throughbore capable of receiving a pig, the ball valve comprising a ball valve case having an upper case bore with a distal end and defining a case bore axis, a first pipe bore, a second pipe bore and a trunnion, the pipe bores defining a flow axis perpendicular to the case bore axis and the trunnion perpendicular to both the case bore axis and the flow axis; 2) mounting a pig magazine on the distal end of the upper case bore, the magazine comprising a bottom plate having a proximal side and distal side with a plate bore aligned with the upper case bore, a magazine plate having a distal side and a proximal side, with the proximal side of the magazine plate abutting the distal side of the bottom plate, a plurality of barrels having a distal end and a proximal end, the proximal end of the barrels extending through the magazine plate to the proximal side of the magazine plate; 3) inserting pigs, each having a proximal end and distal end into more than one barrel; 4) moving the magazine plate with respect to the bottom plate to align a barrel containing a pig with the plate bore; 5) rotating the ball approximately 90 degrees in a first direction from a position wherein the throughbore is within the flow axis to a position wherein the throughbore is substantially perpendicular to the flow axis such that the pig enters the throughbore; and 6) rotating the ball approximately 90 degrees in a second direction wherein the throughbore is again within the flow axis and fluid flow through the flow axis propels the pig through the pipeline. Further, steps 4, 5 and 6 may be repeated.

In additional embodiments of the method, moving the magazine plate to align a barrel with the plate bore is performed by a motor capable of actuating said movement. Still further, rotating the ball is performed by a motor applying rotational force to the trunnion.

In other embodiments of the method the pig enters the throughbore by force of gravity. Alternatively, in certain embodiments of the method, the pig enters the throughbore by applying pressure on a distal end of the pig.

The foregoing has outlined rather broadly the features of the present disclosure in order that the detailed description that follows may be better understood. Additional features and advantages of the disclosure will be described hereinafter, which form the subject of the claims.

BRIEF DESCRIPTION OF THE DRAWINGS

In order that the manner in which the above-recited and other enhancements and objects of the invention are obtained, a more particular description of the invention briefly described above will be rendered by reference to specific embodiments thereof which are illustrated in the appended drawings. Understanding that these drawings depict only typical embodiments of the invention and are therefore not to be considered limiting of its scope, the invention will be described with additional specificity and detail through the use of the accompanying drawings in which.

LIST OF REFERENCE NUMERALS 10 magazine
11 barrel
12 plate bore
13 magazine plate
14 bottom plate
16 disc
20 ball valve
21 ball valve case
22 ball
23 throughbore
24 upper case bore
25 ball valve seat
26 first valve bore
27 second valve bore
28 pig receiving trap
29 flow axis
30 flanges
31 notches
32 motor
33 internal threading
34 external threading 35 basket bores
36 trunnion motor
40 actuator
41 proximal trunnion
42 linear magazine
43 linear magazine plate
44 linear bottom plate
45 retaining brackets
50a Pig (circular)
50b Pig (alternate type)

DETAILED DESCRIPTION

The particulars shown herein are by way of example and for purposes of illustrative discussion of the preferred embodiments of the present invention only and are presented in the cause of providing what is believed to be the most useful and readily understood description of the principles and conceptual aspects of various embodiments of the invention. In this regard, no attempt is made to show structural details of the invention in more detail than is necessary for the fundamental understanding of the invention, the description taken with the drawings making apparent to those skilled in the art how the several forms of the invention may be embodied in practice.

The following definitions and explanations are meant and intended to be controlling in any future construction unless clearly and unambiguously modified in the following examples or when application of the meaning renders any construction meaningless or essentially meaningless. In cases where the construction of the term would render it meaningless or essentially meaningless, the definition should be taken from Webster's Dictionary $3^{rd}$ Edition.

As used herein, the term "pipe" means and refers to a fluid flow path.

As used herein, the term "conduit" means and refers to a fluid flow path.

As used herein, the term "line" means and refers to a fluid flow path.

As used herein, the term "distal" means and refers to a direction away from the center of a ball valve.

As used herein, the term "proximal" means and refers to a direction toward the center of a ball valve.

As used herein, the term "fluid" refers to a non-solid material such as a gas, a liquid or a colloidal suspension capable of being transported through a pipe, line or conduit. Examples of fluids include by way of non-limiting examples the following: natural gas, propane, butane, gasoline, crude oil, mud, water, nitrogen, sulfuric acid and the like.

As used herein, the term "attached," or any conjugation thereof describes and refers to the at least partial connection of two items.

As used herein, the term "pig" means and refers to a device inserted into a pipeline to perform a task. In various embodiments, pigs may be used to clean a pipeline, diagnose structural problems with the pipeline, or separate various fluids or substances in the pipeline. In various embodiments, a pig may be unidirectional or bidirectional. As used herein, the term "nose" means and refers to the front of a unidirectional pig.

As used herein, the term "magazine" means and refers to a supply chamber.

As used herein, an "actuator" is a mechanical device for moving an object.

Various embodiments of the present disclosure generally relate to devices, systems, and/or methods for launching pigs into a pipeline in a cost effective and easy to operate manner. Such embodiments allow easier user access to the pigs than traditional automatic pig launchers. Additionally, such embodiments lower the risk of injury to the user due to lack of scaffolding, or an elevated platform needed to insert or access the pigs. Further, it is also easier to access any one pig as the pigs are not stacked horizontally or vertically on each other. Any pig could be switched out if needed as it is not lined up one after the other. In other designs would need to take out some to reach one in the middle.

One additional advantage of the various embodiments of the invention is that by eliminating a pig stacking column and using a single pig chamber auto loader, the user can prevent more than one pig from entering or partially entering the receiving bore. This may be especially problematic when pigs are of a different height for different purposes, such as a cleaning pig and a camera pig. In situations wherein one pig enters the pig launcher and one pig partially enters the receiving bore, the ball of the pig launcher may not be able to turn, thus preventing flow if fluids. In such instances, repairs must be made before the pig launcher is usable, and before fluid flows through the throughbore.

In various embodiments, pigs may be of different durometer (relative hardness of a material). In various embodiments, a pig may be 2, 3, 4, 6, 8, 10, 12, 14, 16, 18, 20, 24, 30, 36, 42, or 48 inches in diameter. In another embodiment, the diameter of the pig may be of any diameter required for the pipeline to be pigged.

Further embodiments of the invention concern the pig magazine. The magazine may be any number of shapes so long as a single pig is able to drop from the plate bore into a receiving bore of a pig valve upon proper actuation of the magazine and pig valve. In one embodiment the pig magazine is circular or substantially circular, akin to a revolver of a pistol, such that the barrels are in a circular or substantially circular pattern. In another embodiment, the pig launcher is in a straight line with the barrels in a substantially linear pattern. In another embodiment, the shape of the pig magazine may be a "Z" shape, a "X" shape, a "M" shape and the like with barrels positioned in those shapes.

In further embodiments, the magazines can be rotated or shifted such that barrels align with a plate bore. In certain embodiments, the rotation or shift from one position to another may be manual, wherein the user physically pushes, pulls or rotates the magazine. In other embodiments, a hydraulic actuator may be used to push, pull or rotate the magazine in a certain conformation. In other embodiments, an electric, pneumatic, or hydrocarbon powered motor may be used to push, pull or rotate the magazine into proper position for releasing a pig. In still further embodiments, the pressure from the pipe attached to the pig valve can be harnessed to push, pull or rotate the magazine in a certain conformation. In still further embodiments, solar power may be used to power the motors, battery power, alternating current electricity, direct current electricity, wind power or some combination thereof may be used to power the motors In an alternative embodiment, the plurality of barrels may be placed so that the barrels are horizontal and a force other than gravity is used to insert the pig into the flow. In such embodiments, the pig may be introduced into the receiving bore from the plate bore through a push rod, a pressure source acting upon the pig to push it into the receiving bore.

In embodiments of the invention, the pig valve is attached to two pipe bores to create a flow axis. In many embodiments, such pipe bores are in a linear configuration. In many embodiments, such pipe bores are affixed to pipe in order to transport fluids from one location to another. The pipes may be affixed to the pipe bores of the pig valve by welding, bolting and the like.

In such embodiments of the invention wherein the flow axis allows flow from one pipe bore to another pipe bore, in general, the pig valve is not in position to receive a pig. In such embodiments, wherein flow from one pipe bore to another pipe bore through the pig valve is interrupted by the pig valve, the pig valve may be turned about 90 degrees in order to receive a pig into the pig valve receiving bore.

In embodiments wherein the pig valve is turned about 90 degrees in order to receive a pig, the timing of the movement of the magazine and the turning of the pig valve may be synchronized. In such embodiments, the motor which actuates the movement of the pig valve and motor which actuates the movement of the magazine may each receive a signal from the same source causing actuation. Alternatively, the motor which actuates the movement of the pig valve and the motor which actuates movement of the magazine may each receive a signal from different sources which are synchronized with each other.

In certain embodiments, the control system is employed at a petroleum producing facility. In certain other embodiments, the system is employed at a wellhead.

The signal received by the motor which actuates the movement of the pig valve and the motor which actuates the movement of the magazine may be an electrical signal, a wifi signal, a radio transmission, an infrared transmission, a light signal or any other transmission along the electromagnetic spectrum, a wired signal from a coaxial cable or telephone lines through a computer or signal processing device, a hydraulic signal, a pneumatic signal, a mechanical signal or some combination thereof.

The activation of the motors may be started upon an action by an operator or triggered by time or a condition within the pipe. In an embodiment, the activation of the motors may be triggered by an operator in a remote location. In an embodiment, the activation motors may be triggered by an operator locally. In an embodiment, the activation of the motors may be triggered by a timer. The timer may be set by the operator to release pigs at predetermined time intervals.

In a further embodiment, a sensor may be present in a pipe to trigger the activation of the motors and the device upon the achieving of a given event. The event may be a volume of fluid that has passed by or the presence of buildup within the pipeline.

In the aforementioned embodiments, in certain instances, the movement of the magazine may be independent of the movement of the pig valve. In such instances, the pig may be partially through the plate bore and resting on the ball valve, such that when the ball valve is turned about 90 degrees, the pig drops in or is pushed into the receiving bore of the pig valve.

In the aforementioned embodiments, it is contemplated that after the pig enters the receiving bore of the pig valve, the valve will return to a position to allow flow of a fluid from one pipe bore to another. In such embodiments, wherein the pig valve has returned to such a position to allow fluid flow, the fluid may push or propel the pig to another location from the receiving bore.

In certain embodiments, the ball valve case comprises a first valve bore having a diameter less than a diameter of said ball. In certain embodiments, the ball valve case comprises a second valve bore having a diameter less than a diameter of said ball. Such a smaller diameter may be employed in lieu of a basket.

In an embodiment are threaded bolt holes along one opening of the ball valve case and interior threading along another opening of the ball valve case. In implementation, both sides may have threaded bolt holes such that the ball valve case may be bolted to pipe flanges. Alternatively, the ball valve may possess interior threading at both ends such that corresponding pipe with exterior threading may be screwed into the ball valve case.

Figure 1:
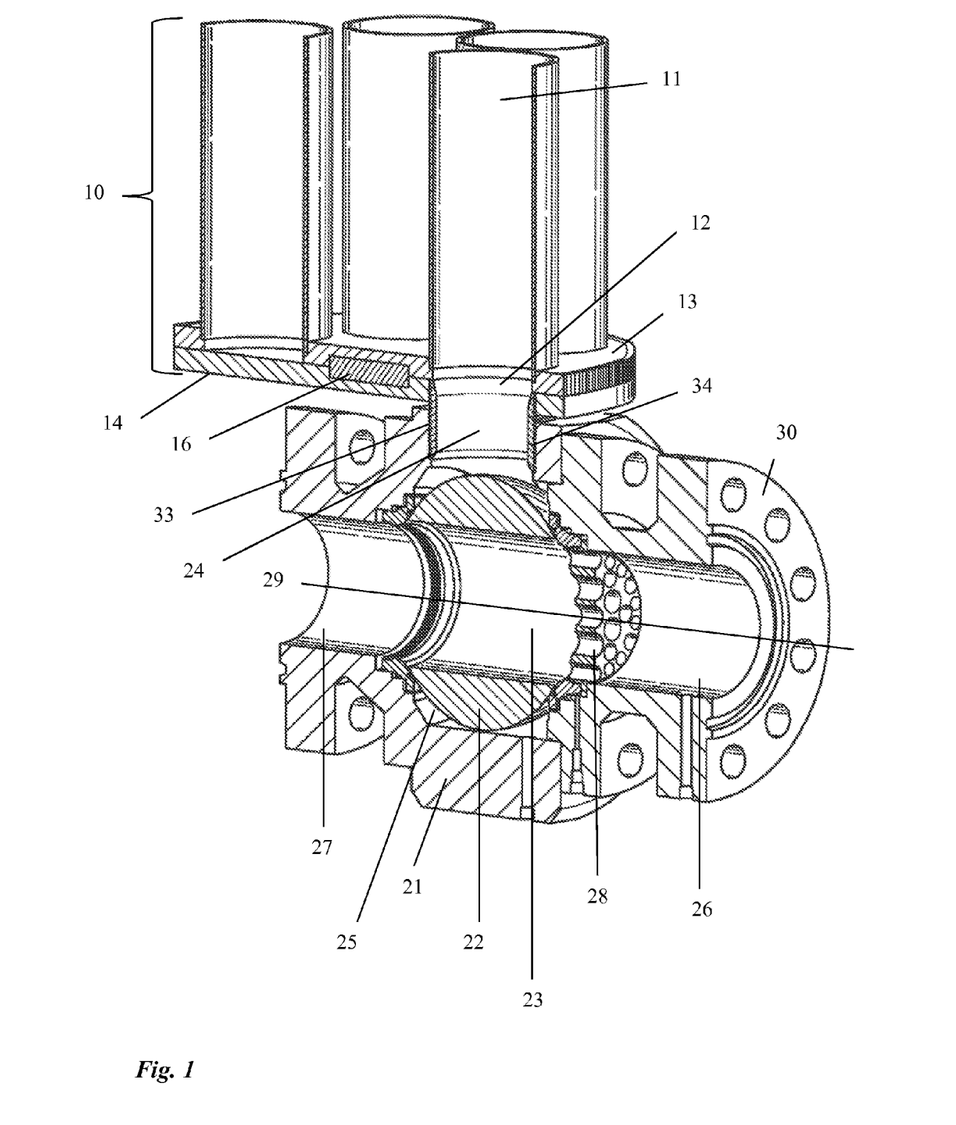
FIG. 1 is a cross sectional illustration of an automatic pig launcher of the present invention illustrating a rotating magazine mounted on a ball valve or pig valve.

Now, referring to the drawings, FIG. 1 is a cross sectional illustration of the magazine 10 of one embodiment of the present invention attached to a ball valve. Depicted in this figure are barrels 11 attached perpendicularly to the magazine plate 13. Each barrel runs from the distal side of the magazine plate to the proximal side of the magazine plate 13. The proximal side magazine plate 13 rest upon the distal side of bottom plate 14, also having a proximal side. Additionally, as shown in FIG. 1, the proximal side of the magazine plate in this particular embodiment rests upon a disc 16. The disc may serve as a rotation point for the magazine plate 13. The bottom plate 14 comprises a plate bore 12 running from an area proximal to the bottom plate 14 such as inside the ball valve to the proximal side of the magazine plate 13. In the aforementioned illustration, the magazine 10, barrels 11, magazine plate 13, bottom plate 14 and disc 16 can be made of any durable material capable of allowing the magazine to rotate and allow a pig to be inserted into a pig valve. Such materials include stainless steel, tungsten, titanium, aluminum, ceramics and the like.

Further in FIG. 1, the ball valve has a ball valve case 21 with an upper case bore 24. The ball valve case 21 further comprises a first pipe bore 26 and a second pipe bore 27. The ball valve case 21 has a ball 22 with a throughbore 23. The ball 22 is located on a ball valve seat 25. A pig valve basket 28 is located between the first pipe bore 26 and the second pipe bore 27 and is used to stop the pig. When the throughbore 23 is aligned with the upper case bore 24, thereby creating a receiving bore, the flow is blocked and the receiving bore formed by the upper case bore 24 aligned with the throughbore 23 is capable of receiving a pig. When the throughbore 23 is aligned with the flow axis 29, the flow is not blocked and the pig can be launched. Further in FIG. 1, at both ends of the ball valve case 21 are flanges 30 which can be bolted to pipes having reciprocal flanges.

Still further in FIG. 1, the ball valve has a ball valve case 21 with an upper case bore 24. The upper case bore may possess internal threading 33 adapted to receive external threading 34 on the proximal side of the bottom plate.

In the aforementioned illustration, the ball valve case 21, ball 22, ball valve seat 25, pig valve basket 28 and the flanges 30 can be made of any durable material capable of allowing the flow of fluids through the pig valve and capable of allowing a pig to be received by the receiving bore. Such materials include stainless steel, tungsten, titanium, aluminum, ceramics and the like.

Figure 2:
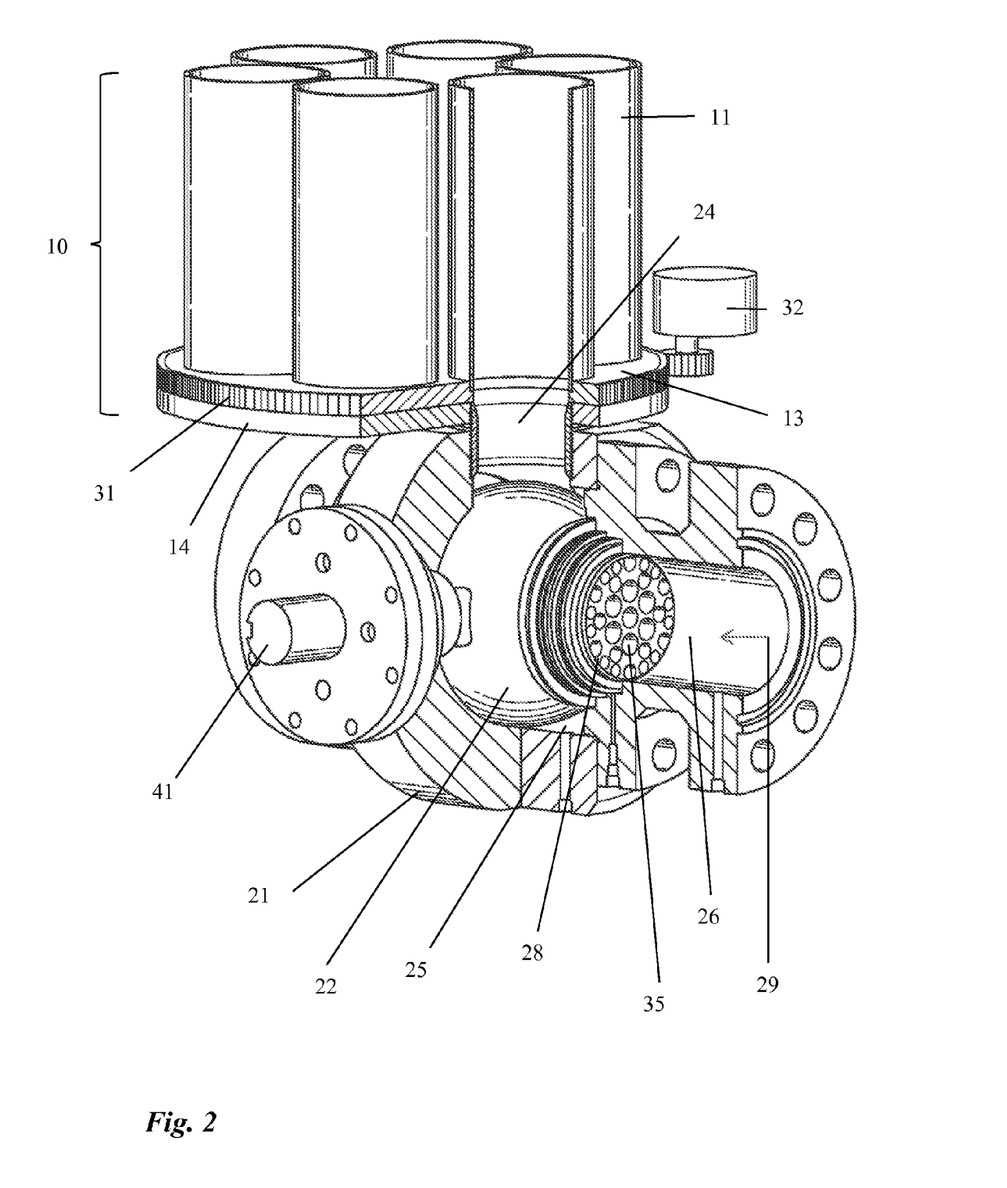
FIG. 2 is a partial cut away sectional illustration of an automatic pig launcher of the present invention illustrating a rotating magazine mounted on a ball valve or pig valve.

Shown in FIG. 2 is a cut out illustration of the magazine 10 of one embodiment of the present invention mounted distally to a ball valve. Depicted in this figure are barrels 11 and attached perpendicularly to the distal side of the magazine plate 13. The proximal side of the magazine plate 13 rest upon the distal side of the bottom plate 14. As more clearly seen in FIG. 3 notches 31 surrounding the magazine plate and perpendicular to the barrels 11 are present. The notches 31 are one embodiment by which the magazine plate 13 can rotate when a force is applied to said notches 31 in a manner which is parallel to the flow axis of the ball valve. A motor 32 with gears adapted to receive the notches may be affixed to the bottom plate of the magazine. The motor may be affixed by bolting, welding, screwing the motor to the bottom plate.

In alternative embodiments, the motor may be a distance from the magazine plate 13 and the bottom plate 14 such that the gears of the motor drive a belt or chain that interacts with the notches 31 of the magazine plate 13. In lieu of notches, the magazine plate may have a frictional surface to allow a belt to grip the surface and turn the magazine plate 13.

In other alternative embodiments, the motor to turn or move the magazine plate 13 may be affixed to the distal side of the magazine plate 13 wherein a shaft of the motor reaches through a central bore of the magazine plate to apply a rotational force to the bottom plate such that the magazine plate turns or moves in a direction with respect to the stationary bottom plate 14.

Alternatively, the bottom plate 14 may be bolted, welded, screwed, pinned or otherwise affixed to the ball valve. In another embodiment, the bottom plate 14 and ball valve may be cast together.

As further illustrated in FIG. 2, the ball valve case 21 further comprises a first valve bore 26 and a second valve bore which is unseen in this illustration. Centrally positioned within the ball valve case 21 is a ball 22, which rests upon a ball valve seat 25. A pig valve basket 28 is located near the first valve bore 26 and possesses basket bores 35 allowing fluids to flow into the throughbore 23 from the first valve bore 26. When a throughbore present within the ball 22 is aligned with the upper case bore 24, the flow is blocked and the ball is capable of receiving a pig. When a throughbore is aligned with the flow axis 29, the flow is not blocked and the pig can be launched.

As further illustrated in FIG. 2, trunnion 41 is attached to the ball 22 in a trunnion axis which is perpendicular to the flow axis of the pig valve. A second trunnion may be located on the opposite side of the ball 22.

Figure 3:
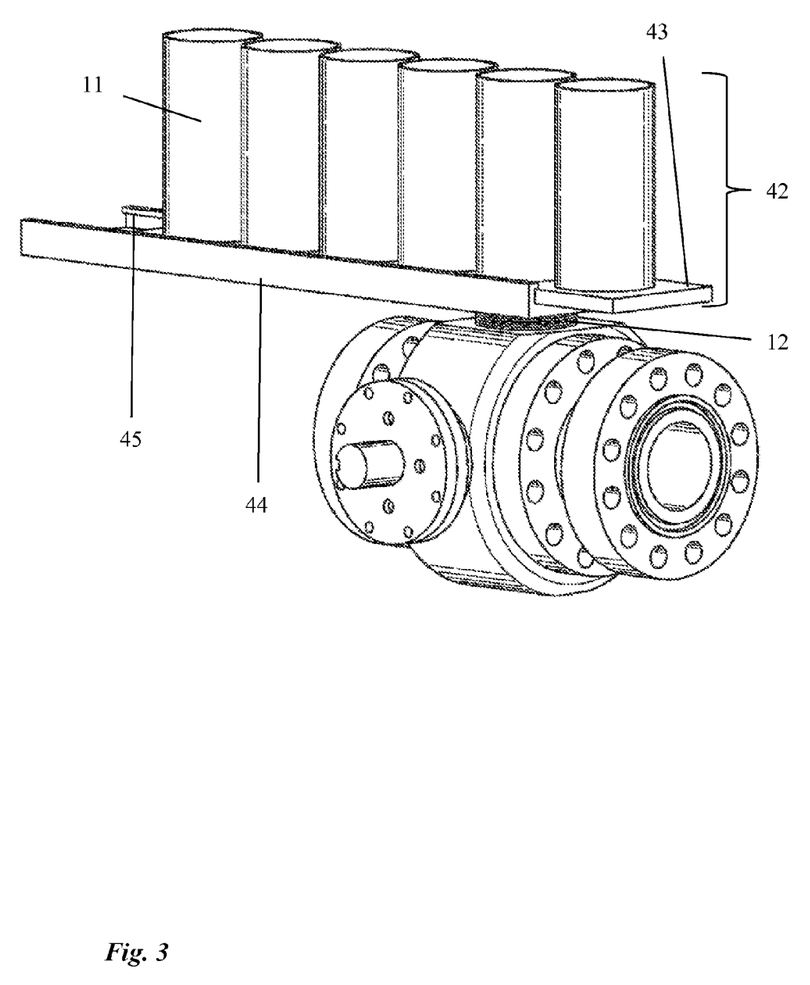
FIG. 3 is an illustration of an automatic pig launcher illustrating a different embodiment of a linear magazine mounted on a ball valve or pig valve.
Figure 4:
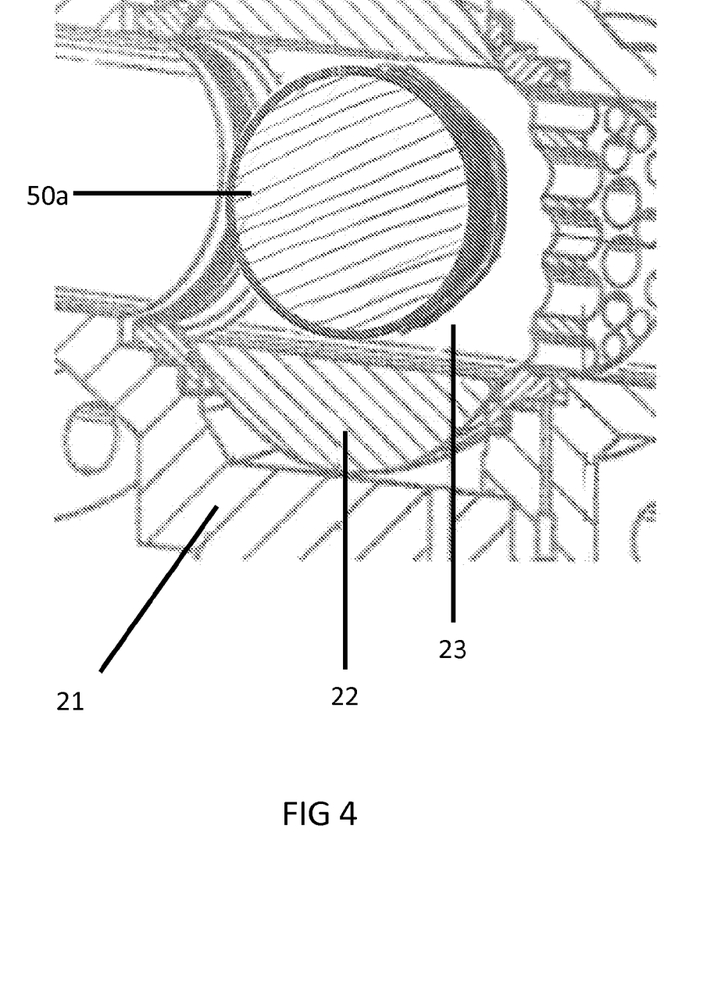
FIG. 4 is a partial view of FIG. 1 illustrating a shows a pig within the throughbore of the ball.
Figure 5:
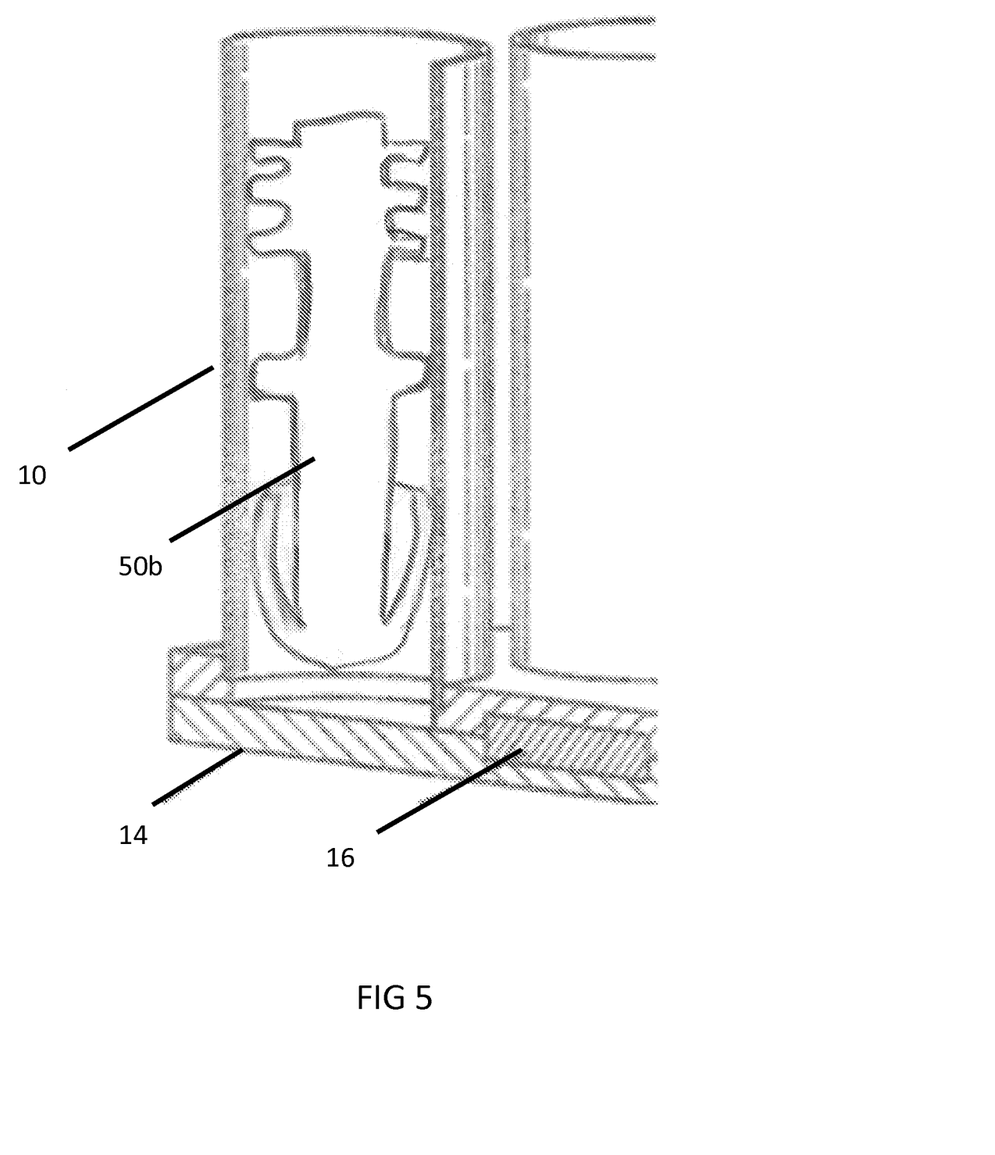
FIG. 5 illustrates a pig within the barrel prior to being moved to the throughbore of the ball.

As illustrated in FIG. 3, the magazine may be a linear magazine

In many embodiments, the trunnion or trunnions may be affixed to the ball in the process of forging, casting, machining or by welding the trunnions to the ball. Alternatively, each trunnion may have a wedge shaped trunnion connector to allow each trunnion to slide into a retaining groove on the face of the ball. In still further embodiments, the ball has a negative non circular indentation shape adapted to receive a positive non circular protrusion such that force applied to the ball valve at such a juncture will turn the ball.

Further embodiments of the invention pertain to a trunnion motor (not shown) to actuate the turn of the trunnion 41 which rotates the ball valve in an approximately 90 degree turn and back again. The trunnion motor may be attached directly to the trunnion in certain embodiments, in other embodiments the trunnion motor may be separate from the trunnion and use a chain or belt mechanism to apply a force to the trunnion in a direction which is parallel to the flow axis of the valve.

In the aforementioned FIG. 2, there are six barrels 11 on the magazine 10 in a circular conformation. In other embodiments, a different number of barrels may be present on the magazine. In an embodiment, the barrels 11 are bolted, welded, screwed, pinned or otherwise affixed to the distal side of the magazine plate 13. In another embodiment, the barrels 11 and the magazine plate 13 may be cast together.

As illustrated in FIG. 3, a linear magazine 42 may be mounted on a pig valve. In such a configuration, the automatic pig launcher may comprise a linear magazine plate 43, slidably connected to a linear bottom plate 44. As seen in FIG. 3, the linear bottom plate 44 retains the linear magazine with retaining brackets 45. As is the case with all embodiments of this invention, a motor (not shown) may be used to move the barrels 11 into place such that they can enter the pig valve. Further depicted in FIG. 3 is the externally threaded plate bore 12 which is fitted to the pig or ball valve.

In implementation of a method of use of the present disclosure, a pig is placed into each barrel 11. When the ball rotates within the ball valve approximately 90 degrees, to block the flow of fluid, the plate bore 12, will be aligned with the throughbore 23 to create a receiving bore. The pig will drop into the receiving bore. Following receipt of the pig into the receiving bore, the ball will be turned by a trunnion motor 36 approximately 90 degrees such that the flow of fluids through the throughbore 23 propels the pig through a pipe bore and into a pipe. Before another pig is received by the receiving bore, the magazine plate will move such that a new barrel 11 with a pig is aligned with the plate bore 12. This movement may take place at the same time as the movement of the ball from a receiving position to a fluid flow position. Alternatively, this movement may take place at some other time.

From the foregoing description, one of ordinary skill in the art can easily ascertain the essential characteristics of this disclosure, and without departing from the spirit and scope thereof, can make various changes and modifications to adapt the disclosure to various usages and conditions. For example, references such as above, below, left, right, and the like are not meant as limiting but rather as a guide for orientation of the referenced element to another element. It will be understood that certain of the above-described structures, functions, and operations of the above-described embodiments are not necessary to practice the present disclosure and are included in the description simply for completeness of an exemplary embodiment or embodiments. In addition, it will be understood that specific structures, functions, and operations set forth in the above-described referenced patents and publications can be practiced in conjunction with the present disclosure, but they are not essential to its practice.

The invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes to the claims which come within the meaning and range of equivalency of the claims are to be embraced within their scope. Further, all published documents, patents, and applications mentioned herein are hereby incorporated by reference, as if presented in their entirety herein.

What is claimed is:

1. A pig launcher comprising:
   a plurality of barrels having a proximal end and a distal end and capable of containing at least one pig, the barrels defining a barrel axis and defining a barrel diameter;
   a magazine plate having a distal side and a proximal side, the distal side in connection with the proximal end of the plurality of barrels, the barrels extending through the magazine plate to the proximal side of the magazine plate;
   a bottom plate having a proximal side and distal side, the distal side abutting the proximal side of the magazine plate comprising a plate bore having a diameter approximately equal to or greater than the barrel diameter;
   a ball valve case having an upper case bore in physical connection the plate bore, the ball valve case further possessing a ball with a throughbore, and a first pipe bore and a second pipe bore, the pipe bores defining a flow axis perpendicular to the barrel axis;
   a trunnion connected to the ball and perpendicular to both the flow axis the barrel axis;
   wherein when the magazine plate is operable to be moved such that the barrel axis is in alignment with the plate bore and the upper case bore; and the ball is operable to be rotated such that the throughbore is in alignment with the barrel axis, the plate bore and the upper case bore such that a pig is operable to be moved from the barrel into the throughbore; and wherein after a pig moves from the barrel into the throughbore, the rotation of the ball approximately 90 degrees results in the throughbore and the pig being aligned with the flow axis.

2. The pig launcher of claim 1, wherein when the pig is aligned with the flow axis, the pig is propelled out of a pipe bore and into a pipe from a pressure exerted by a fluid flowing along the flow axis.

3. The pig launcher of claim 1, wherein movement of the magazine plate can result in each barrel at a time being in alignment with the plate bore.

4. The pig launcher of claim 3, wherein the movement of the magazine plate is performed manually by a user.

5. The pig launcher of claim 3, wherein the movement of the magazine plate to align a barrel with the plate bore is performed by a motor capable of actuating said movement.

6. The pig launcher of claim 5, wherein the trunnion exits the ball valve case and the ball is rotated by a motor applying rotational force to said trunnion.

7. The pig launcher of claim 6, wherein movement of the magazine plate to align a barrel with the plate bore and rotation of the ball is synchronized.

8. The pig launcher of claim 7, wherein the magazine first moves to bring a barrel with a pig in alignment with the plate bore and then the ball rotates such that the throughbore is in alignment with the barrel axis and the pig enters the throughbore, followed by the throughbore rotating about 90 degrees to place the pig in the flow axis.

9. The pig launcher of claim 7, wherein a preconditioned event signals a motor to move the magazine plate and a motor rotate the ball.

10. The pig launcher of claim 9, wherein the preconditioned event is time, temperature change of a fluid flowing through the flow axis, pressure change of a fluid flowing through the flow axis, or a combination thereof.

11. The pig launcher of claim 1, wherein a pig enters the throughbore by force of gravity.

12. The pig launcher of claim 1, wherein a pig enters the throughbore by pressure exerted distal to the pig.

13. The pig launcher of claim 6, wherein the trunnion exits the ball valve case and the ball is rotated by a user applying rotational force to said trunnion.

14. The pig launcher of claim 1, wherein the barrels are in a circular formation.

15. The pig launcher of claim 1, wherein the barrels are in a linear formation.

16. A method of launching multiple pigs into a fluid transporting pipeline, the method comprising:
 a. obtaining a ball valve with a ball having a throughbore capable of receiving a pig, the ball valve comprising a ball valve case having an upper case bore with a distal end and defining a case bore axis, a first pipe bore, a second pipe bore and a trunnion, the pipe bores defining a flow axis perpendicular to the case bore axis and the trunnion perpendicular to both the case bore axis and the flow axis;
 b. mounting a pig magazine on the distal end of the upper case bore, the magazine comprising a bottom plate having a proximal side and distal side with a plate bore aligned with the upper case bore, a magazine plate having a distal side and a proximal side, with the proximal side of the magazine plate abutting the distal side of the bottom plate, a plurality of barrels having a distal end and a proximal end, the proximal end of the barrels extending through the magazine plate to the proximal side of the magazine plate;
 c. inserting pigs, each having a proximal end and distal end into more than one barrel;
 d. moving the magazine plate with respect to the bottom plate to align a barrel containing a pig with the plate bore;
 e. rotating the ball approximately 90 degrees in a first direction from a position wherein the throughbore is within the flow axis to a position wherein the throughbore is substantially perpendicular to the flow axis such that the pig enters the throughbore;
 f. rotating the ball approximately 90 degrees in a second direction wherein the throughbore is again within the flow axis and fluid flow through the flow axis propels the pig through the pipeline; and
 g. repeating steps d, e, and f.

17. The method of claim 16, wherein moving the magazine plate to align a barrel with the plate bore is performed by a motor capable of actuating said movement.

18. The method of claim 17, wherein rotating the ball is performed by a motor applying rotational force to the trunnion.

19. The method of claim 16, wherein the pig enters the throughbore by force of gravity.

20. The method of claim 18, wherein the pig enters the throughbore by applying pressure on a distal end of the pig.

* * * * *